(12) United States Patent
Pilip

(10) Patent No.: US 8,556,713 B2
(45) Date of Patent: Oct. 15, 2013

(54) SINGLE TO MULTI-USER SYNCHRONOUS APPLICATION CONVERSION

(76) Inventor: Michael Pilip, Sunnyvale, CA (US)

( * ) Notice: Subject to any disclaimer, the term of this patent is extended or adjusted under 35 U.S.C. 154(b) by 1008 days.

(21) Appl. No.: 12/616,141

(22) Filed: Nov. 11, 2009

(65) Prior Publication Data

US 2011/0092279 A1 Apr. 21, 2011

Related U.S. Application Data

(60) Provisional application No. 61/253,260, filed on Oct. 20, 2009.

(51) Int. Cl.
*G07F 17/32* (2006.01)
*A63F 13/12* (2006.01)

(52) U.S. Cl.
USPC .............................................. 463/29; 463/42

(58) Field of Classification Search
None
See application file for complete search history.

(56) References Cited

U.S. PATENT DOCUMENTS

| | | |
|---|---|---|
| 4,998,199 A | 3/1991 | Tashiro et al. |
| 5,971,849 A | 10/1999 | Falciglia |
| 8,176,124 B2 * | 5/2012 | Graham et al. ............... 709/205 |
| 2002/0016193 A1 | 2/2002 | Morris et al. |
| 2003/0177187 A1 * | 9/2003 | Levine et al. ................ 709/205 |
| 2003/0190960 A1 | 10/2003 | Jokipii et al. |
| 2005/0138601 A1 * | 6/2005 | Simonoff et al. ............ 717/105 |
| 2006/0007893 A1 * | 1/2006 | Kaplan ......................... 370/335 |
| 2008/0220875 A1 * | 9/2008 | Sohl et al. ....................... 463/42 |
| 2009/0187834 A1 * | 7/2009 | Rapo et al. .................... 715/758 |

* cited by examiner

*Primary Examiner* — Tarek Chbouki
(74) *Attorney, Agent, or Firm* — Patent Jurist; Georgiy L. Khayet

(57) ABSTRACT

A system for converting a single-user application into a multi-user synchronous application, in one example embodiment, comprises synchronous multi-user services to provide a Software Development Kit (SDK) including one or more function calls, which when implemented on one or more client devices allow using the single-user application as the multi-user synchronous application, to receive, upon implementation of the one or more function calls, a request to register the multi-user synchronous application and associated application parameters, register the multi-user synchronous application and the associated application parameters, and to provide a synchronous multi-user server to enable runtime operations of the multi-user synchronous application on the one or more of the client devices. The runtime operations of the multi-user synchronous application include simultaneous running of an application algorithm on the one or more client devices. The system can further comprise displaying progress of one or more users of the multi-user synchronous application on the respective one or more client devices during the simultaneous running of the multi-user synchronous application and making results associated with the multi-user synchronous application visible on the one or more users upon conclusion of the multi-user synchronous application.

19 Claims, 11 Drawing Sheets

SINGLE TO MULTI-USER SYNCHRONOUS APPLICATION CONVERSION

RELATED APPLICATIONS

This application claims the benefit of the filing date of Provisional Application 61/253,260 filed on Oct. 20, 2009, which is incorporated herein by reference.

FIELD

This application relates generally to data processing and more specifically to computer-implemented systems and methods for a single to multi-user synchronous application conversion.

BACKGROUND

A single-user application (e.g., a single-user video game) is an application where input from only one user is expected throughout the course of the use session. The term single-user application implies that the application can only be used by one person, while single-user mode typically refers to a single-user option in a multi-user application. Single-user applications are very common but would be more enjoyable if they could be converted for use by more than one user at a time. However, no simple mechanism by which a single-user application can be converted into a synchronous multi-user application is available.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an example, a computer-implemented system for converting a single-user application into a multi-user synchronous application comprises synchronous multi-user services to provide, a Software Development Kit (SDK) including one or more function calls, which, when implemented on one or more client devices, allow playing of the single-user application as the multi-user synchronous application receives, upon implementation of the one or more function calls, a request to register the multi-user synchronous application and associated application parameters, registers the multi-user synchronous application and the associated application parameters, and provides a synchronous multi-user server to enable runtime operations of the multi-user synchronous application on the one or more client devices.

In an example, the synchronous multi-user server includes an application management console. In an example, the application management console is to enable an authorized user to perform one or more of the following actions: set the application parameters; modify the application parameters; define a winner of the multi-user synchronous application; interrupt the multi-user synchronous application on the one or more client devices participating in the multi-user synchronous application; set an application robot; view data related to users associated with the one or more client devices; view traffic analytics associated with the multi-user synchronous application; and place advertisements.

In an example, the application robot is a virtual representation of the one or more client devices. In an example, the advertisements enable users associated with the one or more client devices to view one or more promotions associated with a further multi-user synchronous application while using the multi-user synchronous application. In an example, the application parameters include one or more scenarios associated with the multi-user synchronous application.

In an example, the synchronous multi-user server includes an application room engine to run the multi-user synchronous application substantially simultaneously on the one or more devices participating in the multi-user synchronous application and to determine the winner. In an example, the one or more client devices participating in the multi-user synchronous application are to run the same version of the multi-user synchronous application, the same scenario of the multi-user synchronous application, and the same application algorithm of the multi-user synchronous application.

In an example, the one or more function calls are to perform one or more of the following: connect the one or more client devices to the synchronous multi-user server upon loading of the multi-user synchronous application; inform the synchronous multi-user server that the one or more client devices have completed the application; notify the synchronous multi-user server that the multi-user synchronous application is to be interrupted; and determine a score associated with the multi-user synchronous application. In an example, the synchronous multi-user server is configured to support one multi-user synchronous application. In an example, the synchronous multi-user server is configured to support one or more multi-user synchronous applications.

In further examples, the above methods steps are stored on a machine-readable medium comprising instructions, which, when implemented by one or more processors, perform the steps. In yet further examples, subsystems, or devices can be adapted to perform the recited steps. Other features, examples, and embodiments are described below.

BRIEF DESCRIPTION OF DRAWINGS

Example embodiments are illustrated by way of example and not limitation in the figures of the accompanying drawings, in which like references indicate similar elements and in which.

DETAILED DESCRIPTION

Figure 1:
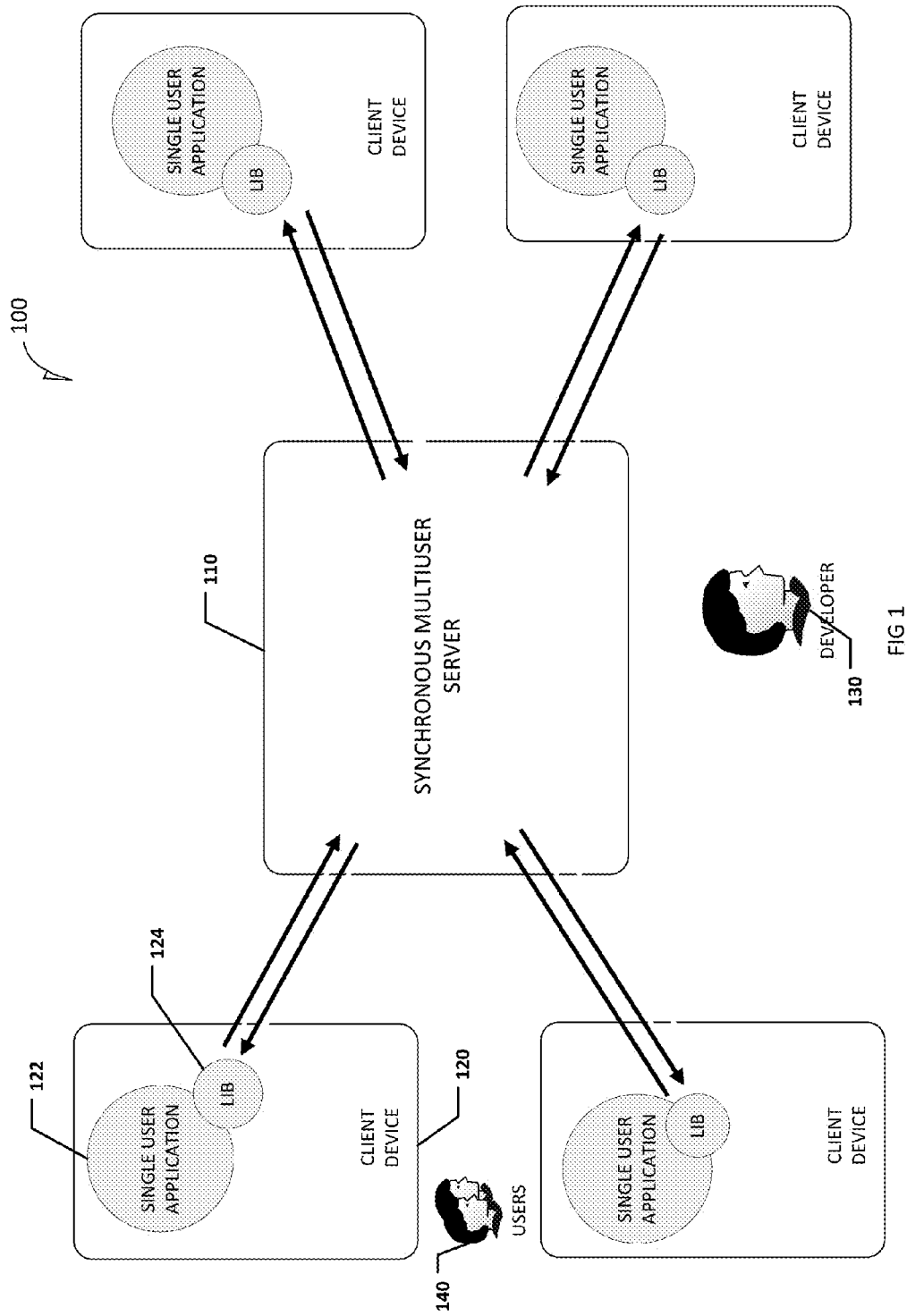
FIG. 1 is a block diagram showing a sample synchronous multi-user server environment within which systems and methods for a single to multi-user synchronous application conversion are implemented, in accordance with an example embodiment.

Example systems and methods for a single to multi-user synchronous application conversion are described. In the following description, for purposes of explanation, numerous specific details are set forth in order to provide a thorough understanding of example embodiments. It will be evident, however, to one skilled in the art, that the present invention may be practiced without these specific details.

The instant disclosure is related to systems and methods for a single to multi-user synchronous application conversion. In the instant disclosure, a game can be used as an example application, and terms "game" and "application" are used interchangeably. It will be understood, however, that the invention is not limited to games.

In one example embodiment, a method for a single to multi-user synchronous application conversion can commence with providing an SDK to an application developer. The SDK can include functions allowing the application developer to convert a single-user application into a synchronous multi-user application. Furthermore, a synchronous multi-user server can be provided to run the application (e.g., a game) simultaneously on multiple client devices.

Using the SDK, a developer can implement a function call to connect a client device to the synchronous multi-user server upon application load. A function call starting the application with predefined application parameters can also be implemented. These application parameters can be predefined by the developer in many different application scenarios. For example, after the game of "Tetris" is played for one minute by all participating players, the scores can be compared. In other examples, players can play at a specific skill level, play until the last player remains, or play until the first player completes a certain level.

Another function call can inform the synchronous multi-user server that the user has completed the application. Yet another function call can be implemented to notify the synchronous multi-user server that the application should be interrupted and the score submitted. Once the above function calls are implemented, the developer can send the updated application to users and the synchronous multi-user server can be ready to serve the application with new multi-user features.

After submitting, the application having been submitted to synchronous multi-user services, an application operator can get access to application usage analytics, user data, and an application management console. Using the application management console, the application operator can change application scenarios and add new ones. Furthermore, the application operator can enable application robots that act as live users when there are no live users in an application room. The application robots can permit the application operators to enable application robots for the synchronous multi-user application that look like other players when there are no live players.

In some example embodiments, instead of using a preexisting application, the application developer can build his own multi-user synchronous application. For this application, the developer can implement server extensions and make them reside within the synchronous multi-user services. Besides multi-user and social functions, the SDK can allow the application developer to connect his applications to one application network.

Application users can be provided with the ability to see other application promotions from inside the application shell. Additionally, the synchronous multi-user application's start and end function calls can be customized to show all application offerings on the application network. On the backend, the developer can be provided with the ability to see the unified users' traffic and user data across all applications in the application network.

FIG. 1 is a block diagram showing sample synchronous multi-user server environment 100 within which systems and methods for a single to multi-user synchronous application conversion can be implemented, in accordance with an example embodiment. As shown in FIG. 1, the sample synchronous multi-user server environment 100 can comprise a synchronous multi-user server 110.

The synchronous multi-user server 110 can provide runtime support to synchronous multi-user applications. The synchronous multi-user server 110 can be configured to run any synchronous multi-user application implemented by a conversion process described herein, a predetermined collection of applications, or as a dedicated server, which supports only one type of synchronous multi-user application. The synchronous multi-user server 110 is described in more detail below with reference to FIG. 3.

An application developer 130 is a software developer (a business or an individual) who creates one or more single-user applications and utilizes functionalities provided by the synchronous multi-user server 110 via a synchronous multi-user library 124 to convert a single-user application into a multi-user synchronous application. The application developer 130 can also be involved in publishing of the applications he creates. In some example embodiments, the application developer 130 is not the creator of the single-user application to be converted into the multi-user synchronous application. Instead, the application developer 130 is engaged by the owners or operators of the single-user application to convert the single-user application into a multi-user synchronous application.

The sample synchronous multi-user server environment 100 can further include a client device 120. The client device 120 is any device on which a synchronous multi-user application can be used by an application user, such as, for example, a mobile telephone or other handset. Other example client devices can have a mere browser or more advanced PC-like functionality which can run complete operating system software and provide a standardized interface and platform for the application developer 130.

In some example embodiments, the synchronous multi-user application can be played simultaneously on a number of client devices 120 and each client device can run the same version of the synchronous multi-user application, the same scenario of the synchronous multi-user application, and the same algorithm associated with the synchronous multi-user application. Each user can use the synchronous multi-user application independently on his respective client device 120 without having to wait for another user's action. If the synchronous multi-user application is a game, a winner of the round of the game can be determined by the synchronous multi-user server 110, which receives results of the game from the client devices 120.

Figure 2:
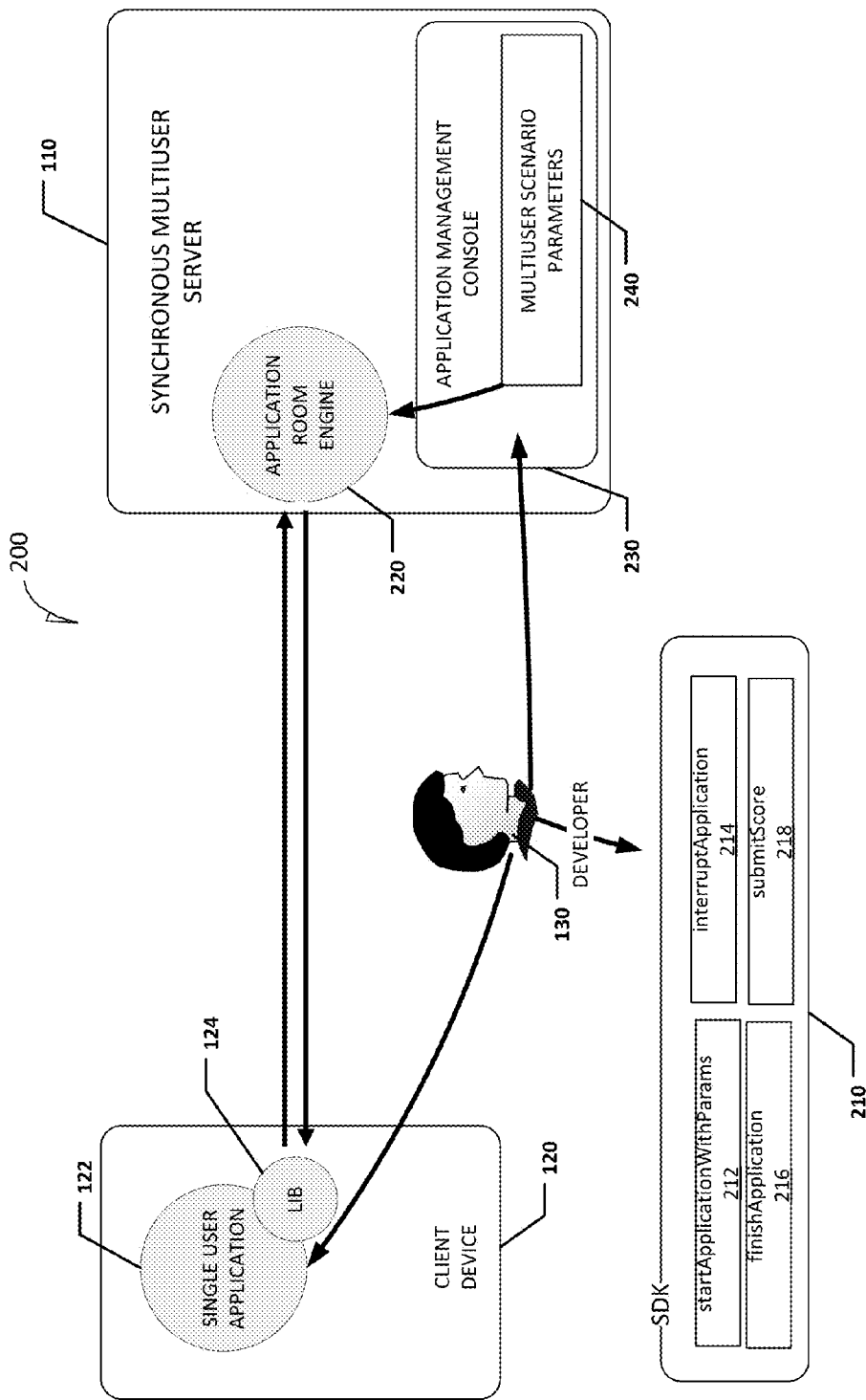
FIG. 2 is a block diagram showing a sample development environment within which systems and methods for a single to multi-user synchronous application conversion are implemented, in accordance with an example embodiment.

FIG. 2 is a block diagram showing a sample development environment 200 within which systems and methods for a single to multi-user synchronous application conversion are implemented, in accordance with an example embodiment. The environment 200 can include the client device 120, the synchronous multi-user server 110, and the SDK 210. The SDK 210 permits a rapid conversion of a single-user application into a synchronous multi-user application. To integrate an existing single-user application, various callback functions can be utilized by the application developer 130. For example, a function call startApplicationWithParams 212 can be used to start a game on the client device with a specific parameter/seed.

The application developer 130 can set multi-user scenario parameters 240 to define scenarios of the synchronous multi-user application when an application room engine 220 starts the synchronous multi-user application. A function call startApplicationWithParameters 212 can be provided in the SDK 210 to set the application parameters on start. The multi-user scenario parameters 240 can include many different scenarios for the synchronous multi-user application. For example, the game of "Tetris" can be played for 1 minute by all players and then their respective scores can be compared, played at a specific level of difficulty, played until the last player remains, or played until the first player finishes a level.

A finishApplication 216 can notify the application room engine 220 that a user associated with the client device 120 has finished the synchronous multi-user application. An optional function call interruptApplication 214 can be provided by the SDK 210 and implemented by the application developer 130 to notify the application room engine 220 that the synchronous multi-user application currently being played on the client device 120 is to be interrupted and the score submitted to the synchronous multi-user server 110. The multi-user scenario parameters are discussed in greater detail below with reference to FIG. 4.

Thus, the SDK 210 can enable the application developer 130 to add synchronous multi-user capabilities to single player applications. An application management console 230 can be provided to allow management of scenarios associated with the synchronous multi-user application.

Figure 3:
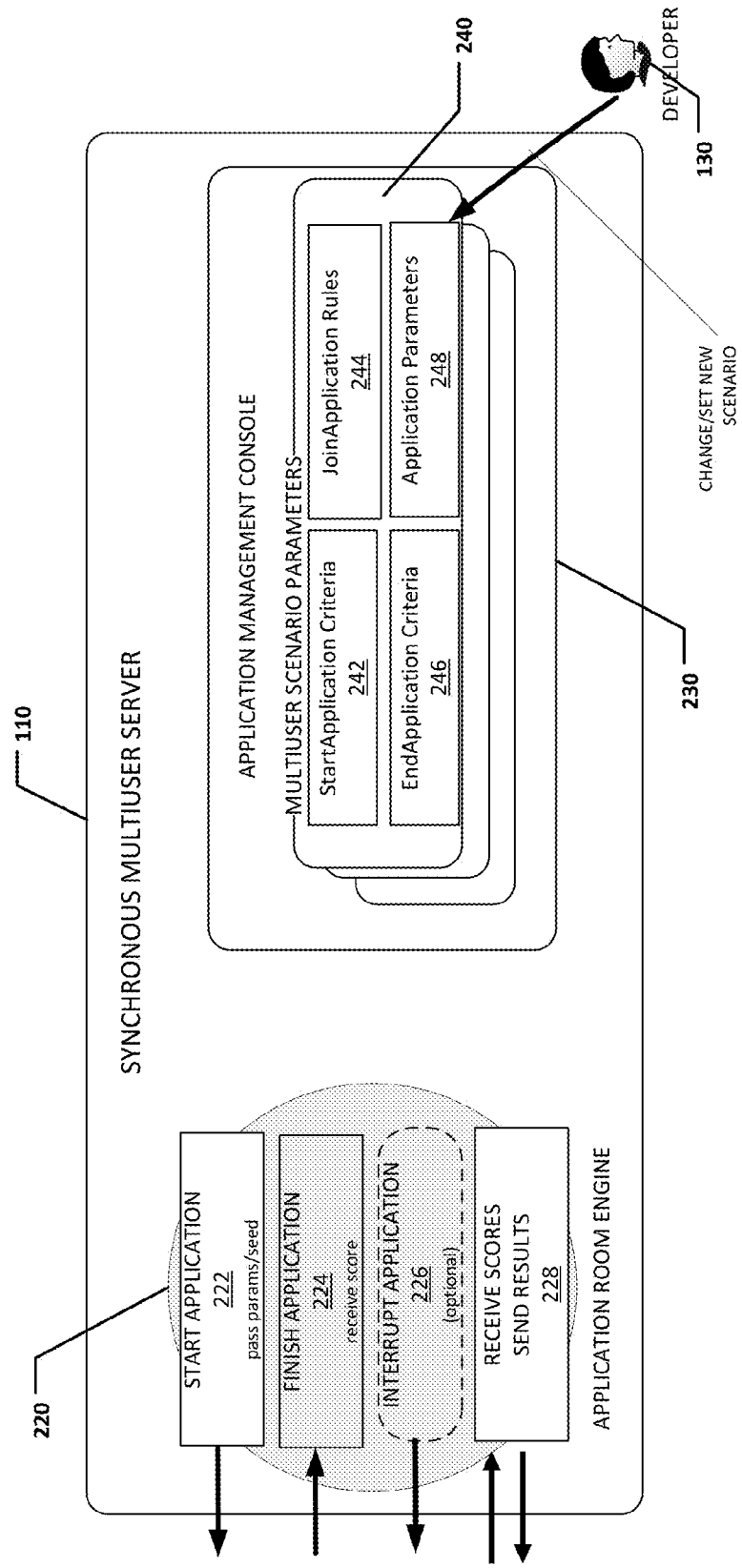
FIG. 3 is a block diagram showing a sample synchronous multi-user server, in accordance with an example embodiment.

FIG. 3 is a block diagram showing the sample synchronous multi-user server 110, in accordance with an example embodiment. The synchronous multi-user server 110 can include the application management panel 230. The application room engine 220 can further include a start application 222, a finish application 224, an optional interrupt application 226, and a receive scores send result 228.

When a user starts the synchronous multi-user application, the client device 120 can connect to the application room engine 220 of the synchronous multi-user server 110 and the user placed in an application room (not shown) run by the application room engine 220. In some example embodiments, the user is able to select an application room based on the application scenario of a particular room.

When a predetermined minimum number of users, including robots, needed to start the synchronous multi-user application have joined an application room, the application room engine 220 starts the synchronous multi-user application for all users in this application room and passes the multi-user scenario parameters 240 to all client devices 120 running the synchronous multi-user application. The synchronous multi-user server 110 can also read the multi-user scenario parameters 240 and define the criteria of finishing the synchronous multi-user application.

In some example embodiments, there can be no predefined multi-user scenario parameters 240 and the synchronous multi-user server 110 can start the synchronous multi-user application using default startApplication criteria 242 and finish the synchronous multi-user application using a default endApplication criteria 246. The default criteria can be set in the multi-user scenario parameters 240. Besides the default criteria, the application developer 130 can set many scenarios for the synchronous multi-user application.

Some of the scenarios do not require any support of the client device 120. Example scenarios that do not require any support from the client device 120 include a minimum number of players for the synchronous multi-user application. Some other scenarios may require support of the client device 120. For example, a random algorithm seed can be needed to run the same session of the synchronous multi-user application on client devices 120.

When the application room engine 220 determines that the synchronous multi-user application needs to be ended, it can send an interruptApplication 226 to all client devices 120 participating in the synchronous multi-user application. Thereafter, the application room engine 220 can define the winner according to the application scenario settings specified in the application parameters 248 and send the results of the synchronous multi-user application to all client devices 120 in the application room.

It will be noted that the process of conversion of a single-user application to a multi-user synchronous application can include passing of the multi-user scenario parameters 240 to the application client associated with the client device 120. The multi-user scenario parameters 240 that define an application scenario can be set on the synchronous multi-user server 110 via the application management console 230. This provides the application operator with an ability to add and/or edit the multi-user scenario parameters 240 when the synchronous multi-user application is deployed to the synchronous multi-user server 110.

Figure 4:
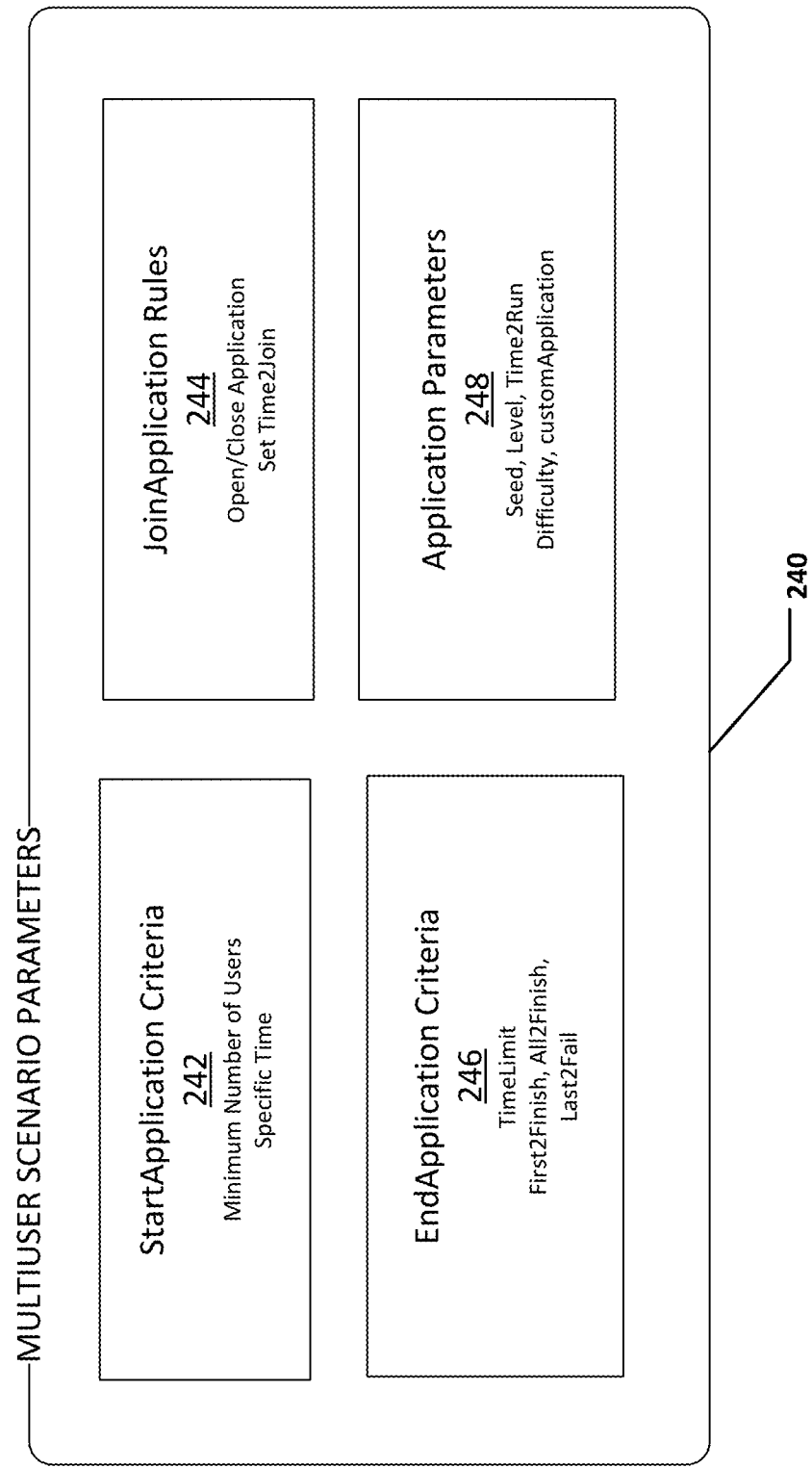
FIG. 4 is a block diagram showing multi-user scenario parameters, in accordance with an example embodiment.

FIG. 4 is a block diagram showing multi-user scenario parameters 240, in accordance with an example embodiment. In some example embodiments, after the synchronous multi-user application is integrated, the application developer 130 can register the synchronous multi-user application to the synchronous multi-user server 110 and define one or more scenarios for the synchronous multi-user application by setting the multi-user scenario parameters 240. Thereafter, the synchronous multi-user server 110 can pass the information associated with the multi-user scenario parameters 240 to the clients of the synchronous multi-user application installed on the client devices 120.

Application parameters 248 can be used to set the minimum number of users needed to start the synchronous multi-user application. JoinApplication Rules 244 can be used to specify whether the application scenario is open or closed, i.e., to define whether other players can join the application while it is running The JoinApplication Rules 244 can also be used to define the maximum time after the start of the synchronous multi-user application within which other users can join the synchronous multi-user application. After the maximum time to join has elapsed, the synchronous multi-user application is played in a closed scenario.

Figure 5:
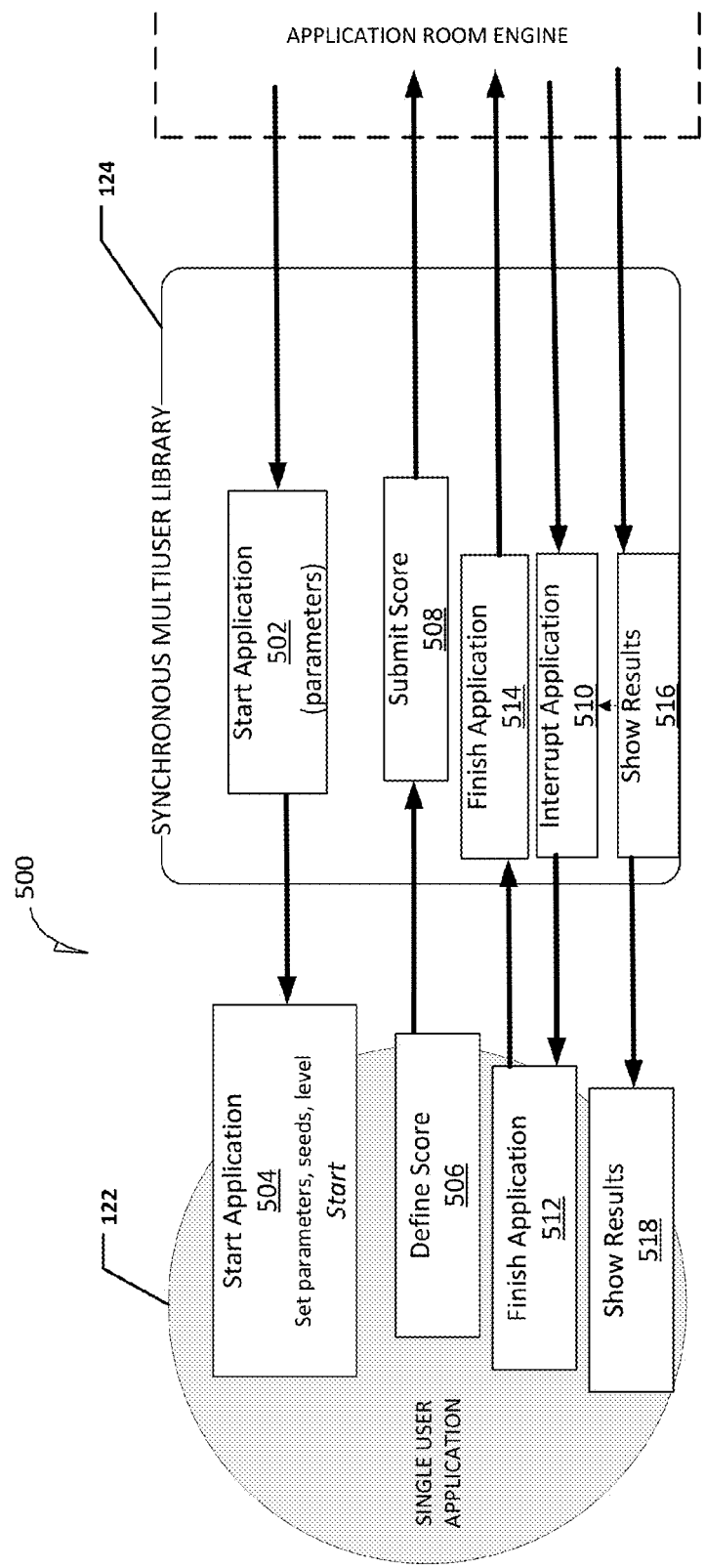
FIG. 5 is a block diagram showing a sample usage of a synchronous multi-user library for a single to multi-user synchronous application conversion, in accordance with an example embodiment.

EndApplication Criteria 246 can be used to set the end-of-round criteria for the synchronous multi-user application. The end-of-round criteria can be utilized to specify whether the synchronous multi-user application is played as a timed race, until the first player finishes, or until the last player remains in the synchronous multi-user application 160. A wait-for-others command can be used to interrupt all clients, once the winner is defined. Thus, the multi-user scenario parameters 240 can be used by the synchronous multi-user server 110 to start and run the synchronous multi-user application, and to configure the same application scenario on all client devices 120. FIG. 5 is a block diagram 500 showing a sample usage of a synchronous multi-user library for a single to multi-user synchronous application conversion, in accordance with an example embodiment.

Figure 6:
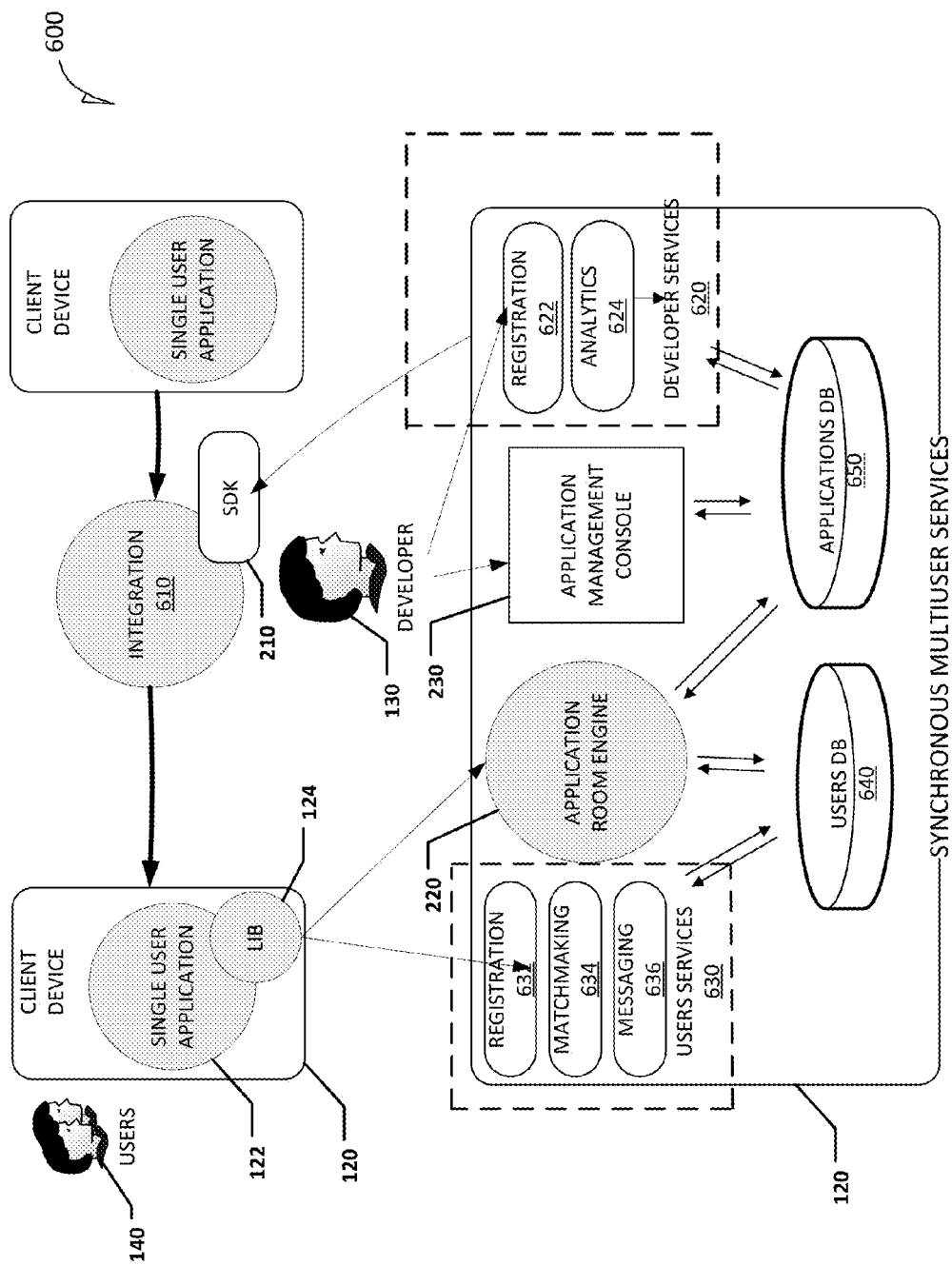
FIG. 6 is a block diagram showing sample synchronous multi-user services, in accordance with an example embodiment.

FIG. 6 is a block diagram 600 showing sample synchronous multi-user services, in accordance with an example embodiment. Synchronous multi-user services 120 can provide dynamically scalable and virtualized multi-user synchronous application implementation resources as a service. The synchronous multi-user services 120 can utilize a computing paradigm allowing computing resources and underlying technical infrastructure to be abstracted away from the application developer 130. The application developer 130 need not have knowledge of, expertise in, or control over the technology infrastructure that supports them. Computing services offered by the synchronous multi-user services 120 can be accessed from, for example, a web browser, while the software and data can be stored at a user's DB 640 and an application DB 650 associated with the synchronous multi-user services 120.

Despite the application room engine 220 being shown within the context of the synchronous multi-user services 120, it will understood that the synchronous multi-user services 120 and the synchronous multi-user server 110 can reside at the different locations and/or provide their respective functionalities as a single physical or logical unit.

The application management console 230 can be utilized by the application operator to manage the synchronous multi-user application after it has been submitted to the synchronous multi-user server 110. The application management console 230 can provide a user interface to permit the application operators and/or the application developer 130 to change application scenarios and add new ones. As shown in FIG. 6, developer services 620 can include registration 622 and analytics 624 to provide the application operator with applications traffic analytics and user reports.

Figure 7:
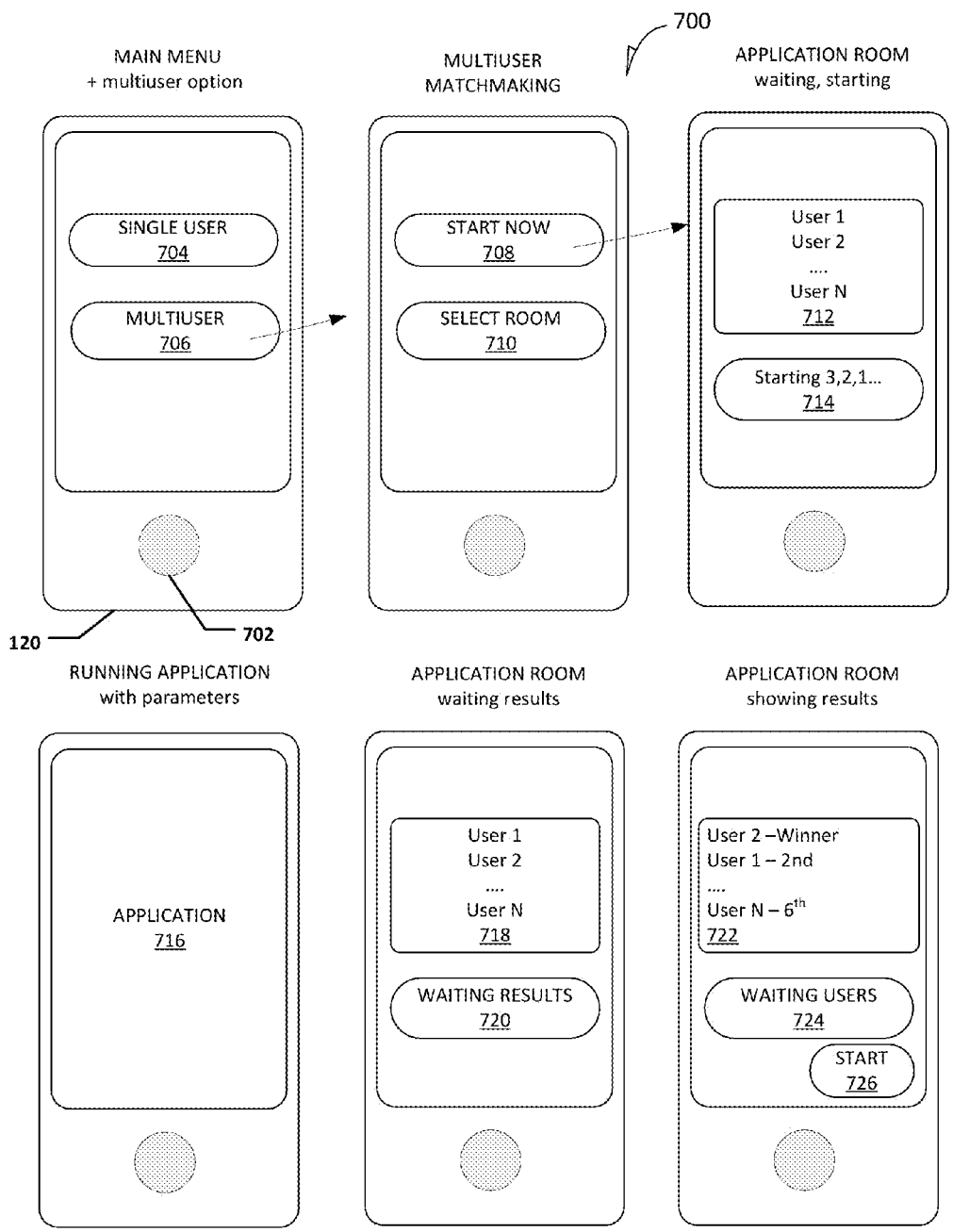
FIG. 7 is a block diagram showing a sample use of a converted multi-user synchronous application within a client device, in accordance with an example embodiment.

FIG. 7 is a block diagram showing a sample usage of a converted multi-user synchronous application 700, in accordance with an example embodiment. A sample scenario can commence in FIG. 6 with a user clicking on a multi-user button 706 within the main menu to select the multi-user version of the application. Once on the multi-user matchmaking page, the user can select a room by clicking on a select room button 710. Thereafter, the user can be automatically matched to an application room 712 based on, for example, geographical location, Internet Protocol (IP) address, or a social network. Thus, the user is placed in the application room 710 and can wait for the start of the synchronous multi-user application by watching a start button 714. Thereafter, the synchronous multi-user application is run with the same parameters for all players.

Once the synchronous multi-user application is finished, the user can wait for the results by watching waiting results 720. Once the results are shown at 722, the user can wait and start another round by clicking on a start button 726. In some example embodiments, featured promotions can be presented to the users. For example, the top five applications, rated by predetermined criteria, can be presented along with information related to the number of the players, whether or not the user's friends liked the applications, and the prices of the applications.

Figure 8:
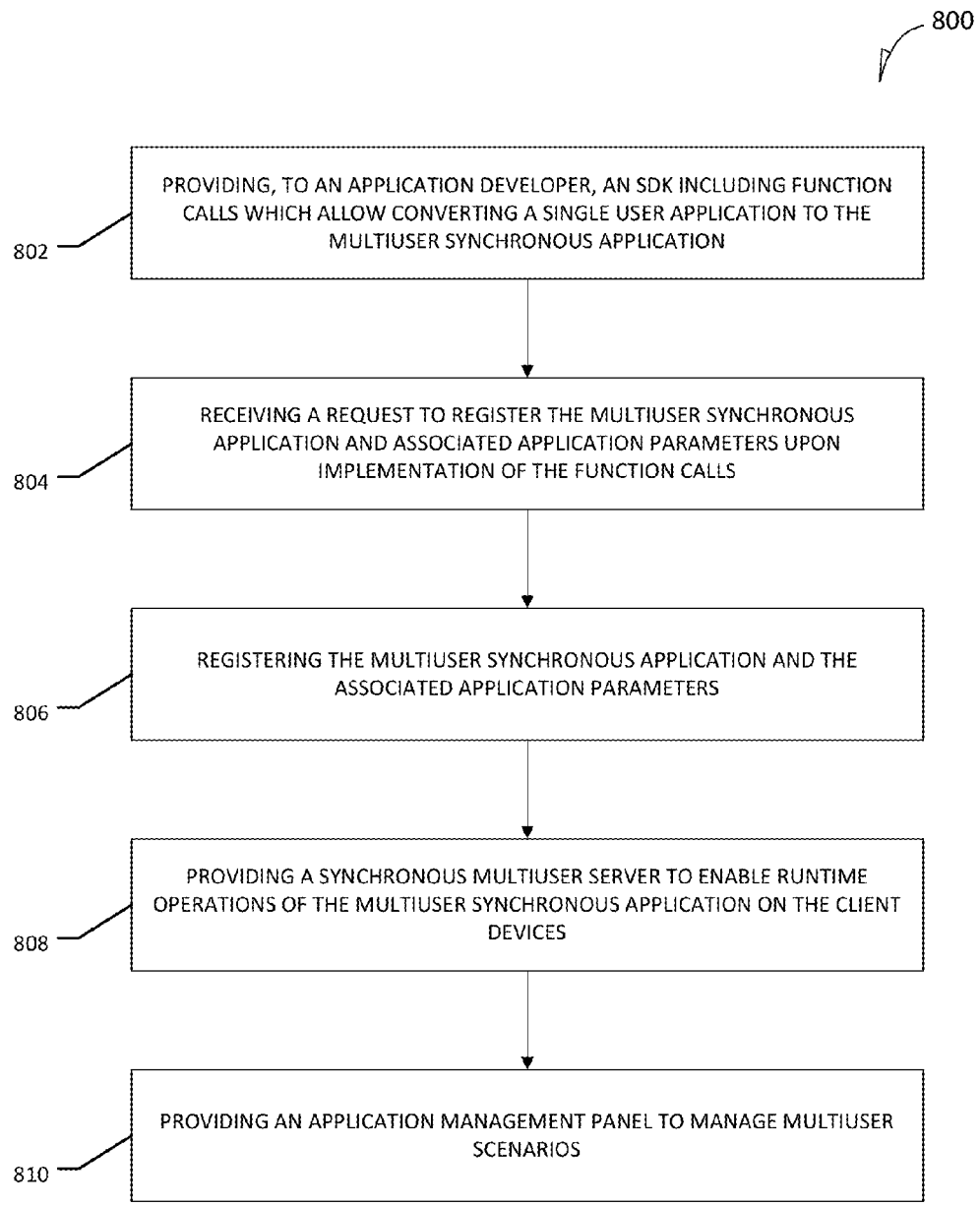
FIG. 8 is a flow chart showing a method for a single to multi-user synchronous application conversion, in accordance with an example embodiment.

FIG. 8 is a flow chart showing a method 800 for a single to multi-user synchronous application conversion, in accordance with an example embodiment. The method 800 may be performed by processing logic that may comprise hardware (e.g., dedicated logic, programmable logic, microcode, etc.), software (such as that which is run on a general-purpose computer system or a dedicated machine), or a combination of both. In one example embodiment, the processing logic resides at the synchronous multi-user server 110 illustrated in FIG. 3.

The method 800 can commence at operation 802 with the synchronous multi-user services 120 providing, to the application developer 130, the SDK 210 including the function calls 212, 214, 216, and 218, which when implemented on one or more client devices 120, allow using the existing single-user application as a multi-user synchronous application.

The function calls 212, 214, 216, and 218 can permit connecting the one or more client devices 120 to the synchronous multi-user server 110 upon loading of the multi-user synchronous application, informing the synchronous multi-user server 110 that the one or more client devices 120 have completed the multi-user synchronous application 160, notifying the synchronous multi-user server 110 that the multi-user synchronous application 160 is to be interrupted, and determining a score associated with the multi-user synchronous application.

Upon implementation of the function calls 212, 214, 216, and 218, the synchronous multi-user server 110 can receive a request to register the multi-user synchronous application and the associated multi-user scenario parameters 240 at operation 804. The multi-user scenario parameters 240 can include one or more scenarios associated with the multi-user synchronous application. The synchronous multi-user server 110 can include the application room engine 220 to run the multi-user synchronous application substantially simultaneously on the one or more devices 120 and to determine the winner of the multi-user synchronous application based on the multi-user scenario parameters 240.

Thereafter, the synchronous multi-user server 110 can register the multi-user synchronous application and the associated multi-user scenario parameters 240 to the synchronous multi-user server 110 at operation 806. The synchronous multi-user server 110 can be provided a means to enable runtime operations of the multi-user synchronous application on the one or more client devices 120 at operation 808. The method 800 can further comprise providing the application management console 230 to an authorized user at operation 810.

The application management console 230 can enable the authorized user to set the scenario parameters 240, modify the scenario parameters 240, define a winner of the multi-user synchronous application, interrupt the multi-user synchronous application on the one or more client devices 120, set an application robot as a virtual representation of the one or more client devices 120, view data related to users associated with the one or more client devices 120, view traffic analytics associated with the multi-user synchronous application, and place advertisements. The advertisements can be related to a further multi-user synchronous application.

The one or more of the client devices 120 participating in the multi-user synchronous application can be programmed to run the same version of the multi-user synchronous application, the same scenario the multi-user synchronous application, and the same application algorithm associated with the multi-user synchronous application. The synchronous multi-user server 110 can be configured to run one multi-user synchronous application on a dedicated application server or one or more multi-user synchronous applications.

Figure 9:
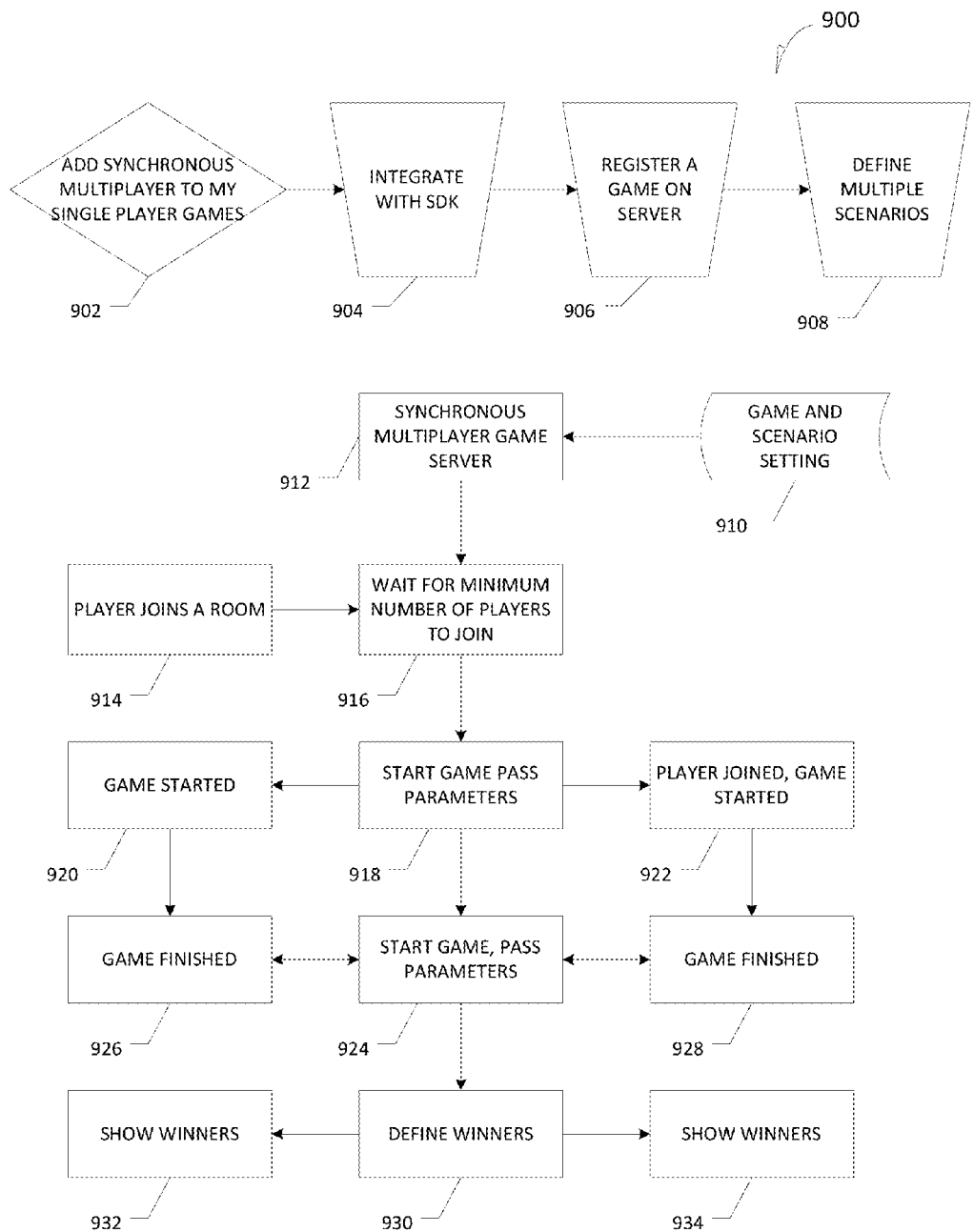
FIG. 9 is a flow chart showing a method for a single to multi-user synchronous application conversion and use, in accordance with an example embodiment.

FIG. 9 is a flow chart showing a method 900 for a single to multi-user synchronous application conversion and use, in accordance with an example embodiment. The method 900 may be performed by processing logic that may comprise hardware (e.g., dedicated logic, programmable logic, microcode, etc.), software (such as that which is run on a general-purpose computer system or a dedicated machine), or a combination of both. In one example embodiment, the processing logic resides at the synchronous multi-user server 110 illustrated in FIG. 3.

The method 900 can commence with adding a synchronous multi-user to user's single player applications at operation 902. At operation 904, the multi-user synchronous application can be integrated with the SDK 210. Thereafter, at operation 906, the multi-user synchronous application can be registered to the synchronous multi-user server 110. At operation 908, the application operators can define multiple application scenarios by setting the application parameters 248. It will be noted that the method 900 may or may not be concerned with the development of a new application with multi-user components. The application developer 130 can utilize a preexisting single-user application (development finished, production ready, live) and add synchronous multi-user capabilities to this application by integrating it with the Application Programming Interface (API) of the synchronous multi-user server 110. The application developer 130 can also build a new single-user application and add synchronous multi-user capabilities to this new application.

The method 900 can continue at operation 910 with the application developer 130 setting application scenarios in the application management console 230 of the synchronous multi-user server 110. When a user connects to the synchronous multi-user server 110, he can be placed in one of the application rooms at operation 914. The user can also choose a room by viewing different application scenarios played in each room.

At operation 916, the multi-user synchronous application can wait for a minimum number of players to join the application room. When the minimum number of players needed to start the multi-user synchronous application has joined, the synchronous multi-user server 110 can start a multi-user synchronous application for all players in the room. When the application function is called by the synchronous multi-user server 110 on all client devices and the players are ready to play the multi-user synchronous application, the synchronous multi-user server 110 passes the multi-user scenario parameters 240 to all application clients at operations 918.

At operation 922, the multi-user synchronous application is started on the second device. Based on the multi-user scenario parameters 240 passed at operation 918, the multi-user synchronous application is finished on both devices at operations 926 and 928 respectively.

If there are no multi-user scenario parameters 240 found for the multi-user synchronous application, the synchronous multi-user server 110 can run the multi-user synchronous application using a default start application criteria and default criteria to finish the multi-user synchronous application. The default criteria can be set in the application management console 230. At operation 930, the winners are defined and, at operations 932 and 934, the winners are shown on all devices.

Figure 10:
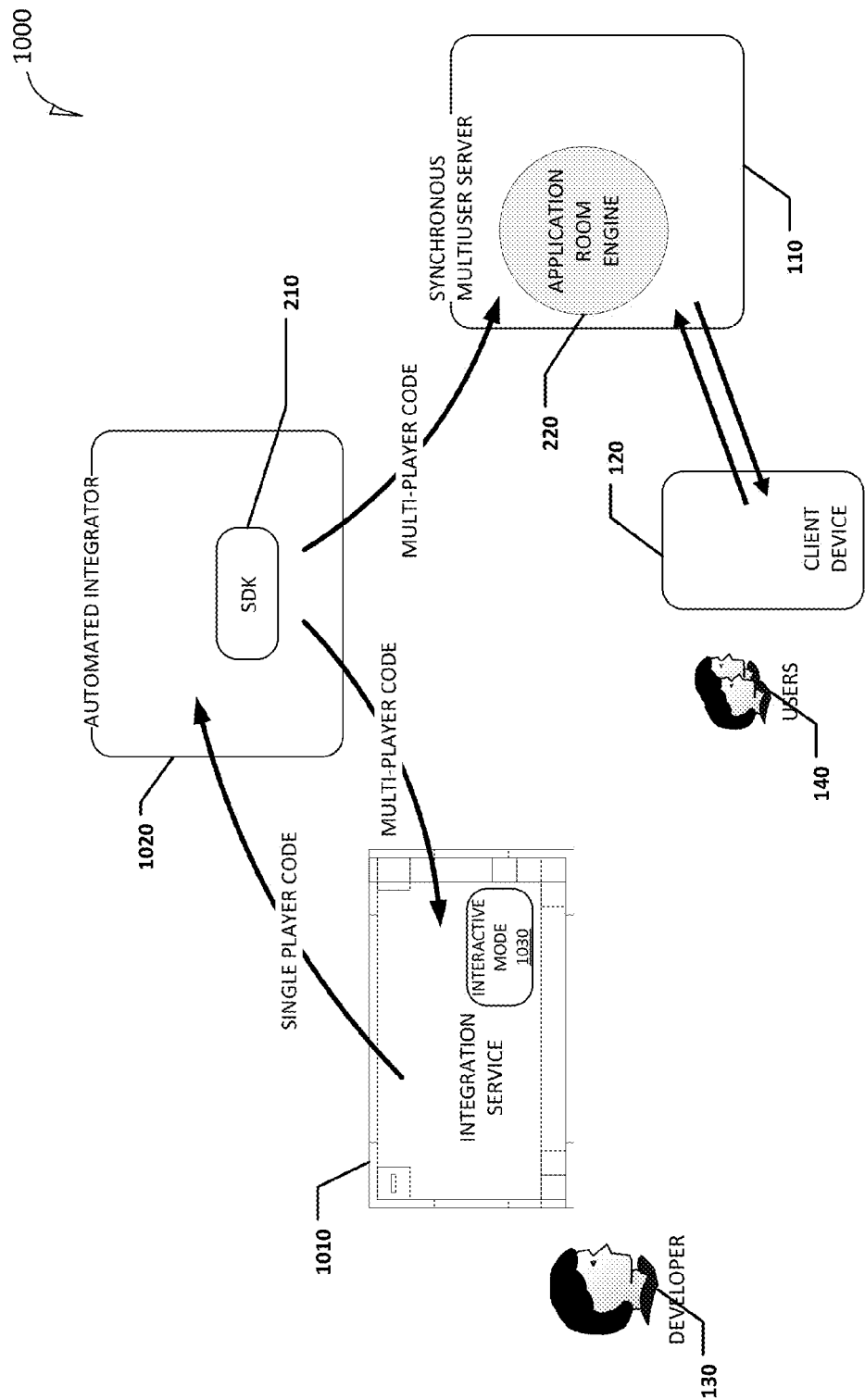
FIG. 10 is a block diagram showing a sample integration environment, in accordance with an example embodiment.

FIG. 10 is a block diagram showing a sample integration environment 1000, in accordance with an example embodiment. As shown in FIG. 10, the integration environment 1000 can include an integration service 1010 (e.g., a website) and an automated integrator 1020. The integration service 1010 can be utilized to receive single-user application computer code (source code or binary code) associated with the single-user application. The single-user application computer code can be sent to the automated integrator 1020. The automated integrator 1020 can automatically integrate the single-user computer code with multi-player API provided by the SDK 210. The resulting multi-user computer code can be sent back to the developer 130.

In some example embodiments, the resulting multi-user computer code can be immediately accepted by the synchronous multi-user server 110 to run the application room engine 220. In some example embodiments, the integration service 1010 and the automated integrator 1020 can run in an interactive mode 1030. In the interactive mode 1030, the automated integrator 1020 can automatically analyze the computer code and suggest one or more options for a manual selection by the application developer 130. Based on the manual selection made by the application developer 130 through the integration service 1010, the automated integrator 1020 can automatically integrate the one or more function calls to produce the integrated computer code. The resulting multi-user computer code can be sent back to the developer 130 or be immediately accepted by the synchronous multi-user server 110 to run the application room engine 220.

Figure 11:
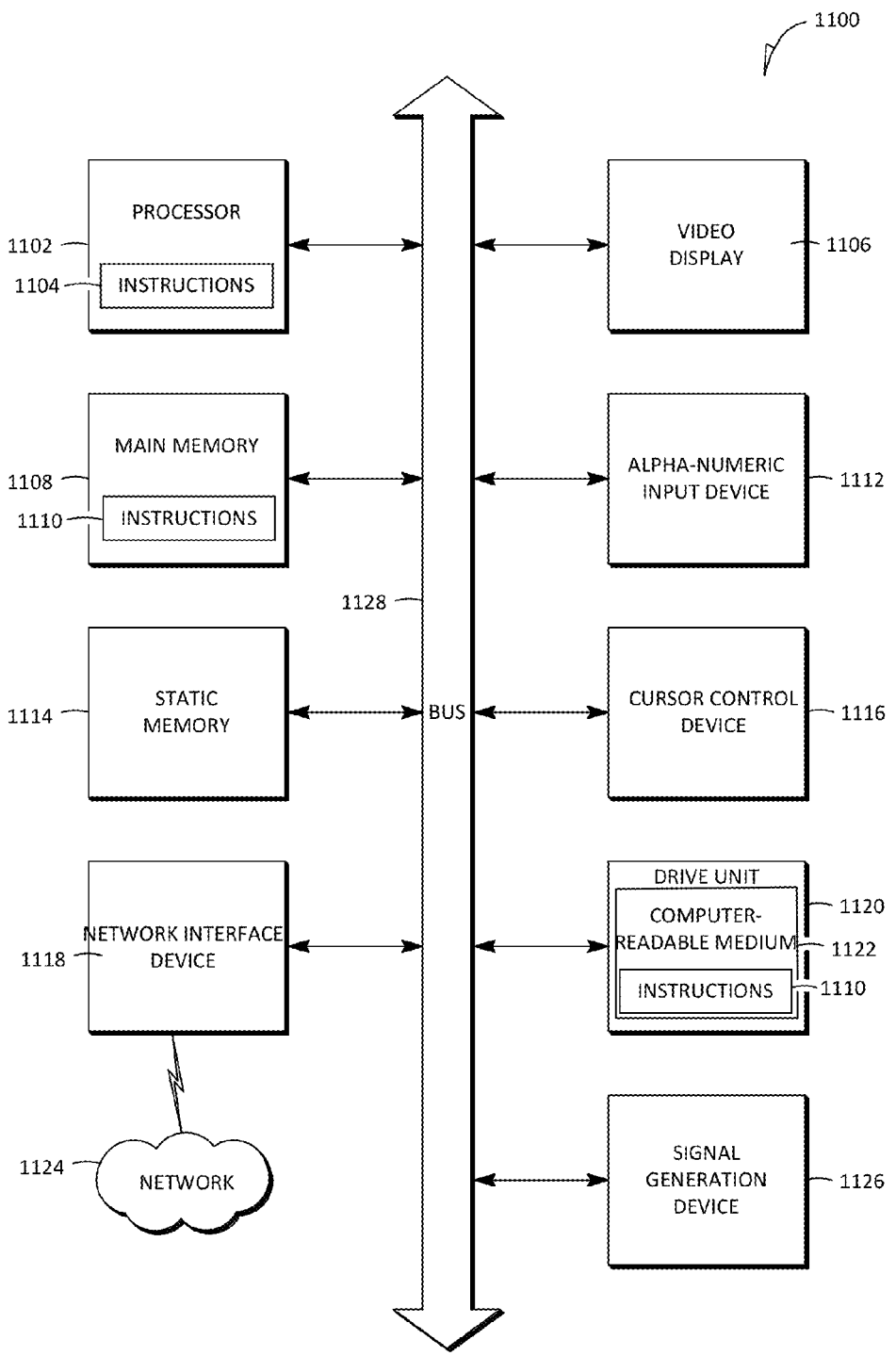
FIG. 11 is a diagrammatic representation of an example machine in the form of a computer system within which a set of instructions for causing the machine to perform any one or more of the methodologies discussed herein is executed.

FIG. 11 is a diagrammatic representation of an example machine in the form of a computer system 1100, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor or multiple processors 1102 (e.g., a central processing unit (CPU), a graphics processing unit (GPU), or both), and a main memory 1108 and static memory 1114, which communicate with each other via a bus 1128. The computer system 1100 may further include a video display unit 1106 (e.g., a liquid crystal display (LCD)). The computer system 1100 may also include an alphanumeric input device 1112 (e.g., a keyboard), a cursor control device 1116 (e.g., a mouse), a voice recognition or biometric verification unit, a disk drive unit 1120, a signal generation device 1126 (e.g., a speaker) and a network interface device 1118. The computer system 1100 may further include a data encryption module (not shown) to encrypt data.

The disk drive unit 1120 includes a computer-readable medium 1122 on which is stored one or more sets of instructions and data structures (e.g., instructions 1110) embodying or utilizing any one or more of the methodologies or functions described herein. The instructions 1110 may also reside, completely or at least partially, within the main memory 1108 and/or within the processors 1102 during execution thereof by the computer system 1100. The main memory 1108 and the processors 1102 may also constitute machine-readable media.

The instructions 1110 may further be transmitted or received over a network 1124 via the network interface device 1118 utilizing any one of a number of well-known transfer protocols (e.g., Hyper Text Transfer Protocol (HTTP)).

While the computer-readable medium 1122 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, methods and systems for conversion of a single-user application to a synchronous multi-user application have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What I claim is:

1. A computer-implemented method for integrating gaming applications, the method comprising:
   providing a Software Development Kit (SDK) including one or more function calls, which when implemented on one or more client devices, to convert a single-user application running on a client device into a multi-user synchronous application and to allow using the single-user application as the multi-user synchronous application;
   upon implementation of the one or more function calls, the implementation including automatically integrating the single-user application with a multi-player API provided by the SDK, receiving a request to register the single-user application parameters with the multi-user synchronous application and associated application parameters of a remote server;
   registering the multi-user synchronous application and the associated application parameters running on the remote server; and
   providing a multi-user synchronous server to enable runtime operations of the multi-user synchronous application on the one or more client devices, wherein the multi-user synchronous server comprises an application room engine to run the multi-user synchronous application substantially simultaneously on the one or more devices participating in the multi-user synchronous application wherein the application room engine is configured to support a plurality of multi-user synchronous applications.

2. The computer-implemented method of claim 1, wherein the implementation comprises receiving first computer code associated with the single-user application and automatically integrating the one or more function calls to produce second computer code, the second computer code being associated with the multi-user synchronous application.

3. The computer-implemented method of claim 2, wherein the computer code is selected from one or more of the following: source code and binary code.

4. The computer-implemented method of claim 3, further comprising running the implementation in an interactive mode, the interactive mode including automatically analyzing the computer code, suggesting one or more option for a manual selection by an application developer, and based on the manual selection, automatically integrating the one or more function calls to produce the second computer code.

5. The computer-implemented method of claim 1, wherein the runtime operations of the multi-user synchronous application include simultaneous running of an application algorithm on the one or more client devices.

6. The computer-implemented method of claim 5, further comprising displaying progress of one or more opponents on the one or more client devices during the simultaneous running of the multi-user synchronous application and making results associated with the multi-user synchronous application visible on the one or more client devices upon conclusion of the multi-user synchronous application.

7. A computer-implemented system for integrating gaming applications, the system comprising:
   a processor; and
   a memory communicatively coupled with the processor, the memory storing instructions which when executed by the processor perform a method comprising:
   providing a Software Development Kit (SDK) including one or more function calls, which when implemented on one or more client devices to convert a single-user application running on a client device into a multi-user synchronous application and to allow using of the single-user application as the multi-user synchronous application;
   receiving, upon implementation of the one or more function calls, the implementation including automatically integrating the single-user application with a multi-player API provided by the SDK, a request to register the single-user application parameters with the multi-user synchronous application and associated application parameters of a remote server;
   registering the multi-user synchronous application and the associated application parameters running on the remote server; and
   providing a synchronous multi-user server to enable runtime operations of the multi-user synchronous application on the one or more client devices, wherein the multi-user synchronous server comprises an application room engine to run the multi-user synchronous application substantially simultaneously on the one or more devices participating in the multi-user synchronous application wherein the application room engine is configured to support a plurality multi-user synchronous applications.

8. The computer-implemented system of claim 7, wherein the method executed by the processor further comprises receiving first computer code associated with the single-user application and to automatically integrate the one or more function calls, thereby producing second computer code, the second computer code being associated with the multi-user synchronous application.

9. The computer-implemented system of claim 8, wherein the method executed by the processor further comprises receiving the first computer code and, upon the integration, make the second computer code available for the runtime operations of the multi-user synchronous application.

10. The computer-implemented system of claim 9, wherein the method executed by the processor further comprises:
running the implementation in an interactive mode, the interactive mode including automatically analyzing the computer code;
suggesting one or more option for a manual selection by an application developer;
based on the manual selection, automatically integrating the one or more function calls to produce the second computer code.

11. The computer-implemented system of claim 7, wherein the synchronous multi-user server includes an application management console.

12. The computer-implemented system of claim 7, wherein the application management console is to enable an authorized user to perform one or more of the following actions: set the application parameters, modify the application parameters, define a winner of the multi-user synchronous application, interrupt the multi-user synchronous application on the one or more client devices participating in the multi-user synchronous application, set an application robot, view data related to users associated with the one or more client devices, view traffic analytics associated with the multi-user synchronous application, and place advertisements.

13. The computer-implemented system of claim 12, wherein the application parameters are used by the synchronous multi-user server to define start, join and finish options of the multi-user synchronous application.

14. The computer-implemented system of claim 12, wherein the application parameters include one or more scenarios associated with the multi-user synchronous application.

15. The computer-implemented system of claim 7, further comprising an application room engine to run the multi-user synchronous application substantially simultaneously on the one or more devices participating in the multi-user synchronous application and to determine the winner.

16. The computer-implemented system of claim 15, wherein the one or more function calls are to perform one or more of the following: connect the one or more client devices to the application room engine upon loading of the multi-user synchronous application, inform the application room engine that the one or more client devices have completed the application, notify the application room engine that the multi-user synchronous application is to be interrupted, and to determine a score associated with the multi-user synchronous application.

17. The computer-implemented system of claim 15, wherein the application room engine is configured to support one multi-user synchronous application.

18. The computer-implemented method of claim 15, wherein the application room engine is configured to support one or more of multi-user synchronous applications.

19. A non-transitory machine-readable medium comprising instructions for integrating gaming applications, which when implemented by one or more processors, performs the following operations:
provide a Software Development Kit (SDK) including one or more function calls, which when implemented on one or more of client devices to convert a single-user application running on a client device into a multi-user synchronous application and to allow playing of the single-user application as the multi-user synchronous application;
upon implementation of the one or more function calls, the implementation including automatically integrating the single-user application with a multi-player API provided by the SDK, receive a request to register the single-user application parameters with the multi-user synchronous application and associated application parameters a remote server;
register the multi-user synchronous application and the associated application parameters running on the remote server; and
provide a synchronous multi-user server to enable runtime operations of the multi-user synchronous application on the one or more client devices, wherein the multi-user synchronous server comprises an application room engine to run the multi-user synchronous application substantially simultaneously on the one or more devices participating in the multi-user synchronous application wherein the application room engine is configured to support a plurality of multi-user synchronous applications.

\* \* \* \* \*